July 13, 1965           W. F. SMITH           3,194,854
PROCESS FOR PRODUCING THERMOPLASTIC FOAMS
Filed Sept. 3, 1963
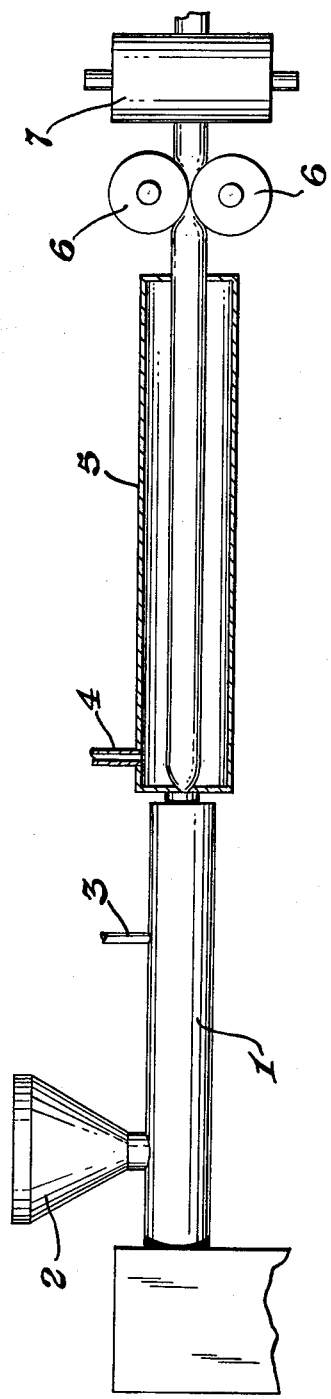
INVENTOR.
William F. Smith
BY *Griswold & Burdick*
ATTORNEYS

United States Patent Office 3,194,854
Patented July 13, 1965

3,194,854
PROCESS FOR PRODUCING THERMO-
PLASTIC FOAMS
William F. Smith, Lake Jackson, Tex., assignor to The
Dow Chemical Company, Midland, Mich., a corporation of Delaware
Filed Sept. 3, 1963, Ser. No. 306,366
8 Claims. (Cl. 264—53)

This application is a continuation-in-part of application, Serial No. 72,330 filed November 29, 1960, now abandoned.

This invention relates to a process for the manufacture of cellular thermoplastic polymer products. It relates more particularly to the production of foam products in the form of substantially uniform non-shrinking cellular bodies, in continuous manner, from normally solid thermoplastic homopolymers of ethylene and copolymers thereof.

It is known that cellular thermoplastic products composed for the most part of individually-closed, thin-walled cells of substantially uniform size, can readily be prepared in continuous manner by forming a homogeneous mobile gel or solution of a normally gaseous agent in a thermoplastic polymer under pressure and thereafter extruding the mobile gel or solution through a constricted passageway, e.g. an extrusion die or orifice, into a zone of lower pressure.

The present invention provides an improved method for continuously producing substantially uniform, non-shrinking, cellular organic thermoplastic products, of valuable utility, by an extrusion process.

According to the invention, a normally solid polymer or a copolymer of a predominant amount of ethylene and a minor proportion of another monoethylenically unsaturated monomer copolymerizable therewith, is heated to its softening point or above, under pressure and in contact with a volatile organic fluid, e.g. a normally gaseous agent, in a pressure resistant vessel such as a plastic extruder, or the like, to form a homogeneous composition which is extruded through an orifice or die, immediate to, and in combination with, the extruder, into a zone of lower pressure and allowed to foam to a cellular product, and concurrently therewith or immediately thereafter passing the cellular polymer into and through an enclosed area or chamber wherein the atmosphere consists predominantly of vapors of a normally gaseous agent capable of diffusing into the cells of the foam and thereafter crushing the foam to rupture at least a portion of the cells.

The process can be better illustrated with reference to the accompanying drawing wherein 1 is an extruder having a hopper 2, a gas inlet tube 3, a die 8, and having attached thereto a jacket or curing chamber 5 with a curing gas inlet tube 4. The crushing rollers are indicated by numerals 6 and 7. The thermoplastic polymer or copolymer is passed into heated extruder 1 from the hopper 2. The gaseous agent is introduced by means of inlet tube 3 and contacts the molten polymer or copolymer to form a homogeneous mobile gel or solution. The gel is extruded into a chamber of lower pressure 5 wherein it expands to form the desired cellular product. By means of inlet 4, a gaseous agent, either identical to the one used for blowing the polymer, different from the one used for blowing, or a mixture of different agents, capable of diffusing into the cells of the foamed polymer, is passed into the chamber 5 in order to maintain a predetermined atmosphere and pressure. The cellular product, upon leaving the chamber 5, immediately, or almost immediately, passes through two sets of rollers, preferably located at right angles to each other. These rollers crush the foam and rupture or break open the closed cell walls.

The polymers useful in this invention are the normally solid, thermoplastic polymers of ethylene and the copolymers of a predominant amount of ethylene and a monomer such as vinyl acetate, acrylic acid or an alkyl acrylate. The polymer starting materials can be prepared according to the methods described in U.S. Patents 2,153,-553; 2,188,465; and 2,200,429.

The volatile organic fluid, blowing agent, can be a normally gaseous agent or a volatile organic liquid for forming the cellular product and should be an organic substance which is soluble in, or at least appreciably soluble in, the polymer under an applied pressure of several atmospheres. Said organic fluid is preferably one which is gaseous at room temperature and atmospheric pressure. Examples of volatile organic fluids substances which are suitable in forming the cellular thermoplastic products are the normally gaseous halocarbons such as methyl chloride, ethyl chloride, dichloromonofluoromethane, trichloromono fluoromethane, dichlorodifluoromethane, dichlorotetrafluoroethane and normally gaseous hydrocarbons such as the mixed butylene waste cut from butadiene plants, butane, propylene, butylene, isobutane, pentane, hexane, isopentane, petroleum ether and cyclopentane. Mixtures of any two or more of the above compounds may also be used.

The amount of the volatile organic fluid agent dissolved in the polymer in forming the cellular product should be such that upon release of the pressure at the temperatures employed, it is vaporized almost completely, causing not only swelling and expansion of the polymer to form the cellular product, but at the same time cooling it. Said agent is usually employed in amount corresponding to from 0.05 to 0.25 part, preferably from 0.05 to 0.20 part, by weight per part of the thermoplastic polymer used, i.e. in amount corresponding to from about 5 to 25 percent, based on the weight of the polymer.

The normally gaseous agent within the chamber can be at atmospheric pressure, superatmospheric pressure, or subatmospheric pressure and must be of the type of volatile organic fluids hereinbefore described, i.e. it must be in gaseous form and be substantially soluble in the polymer and it must be capable of diffusing into the foamed polymer at about the same rate the blowing agent diffuses out of the foamed polymer cells. The chamber should be of such size and length as to allow the cellular material to be in contact with the organic vapors for a time sufficient to cool and cure to a state of dimensional stability. This time will vary with the thickness of the foam and is directly proportional thereto, as, for example, a foam of ¼ inch diameter will cool and cure more rapidly than a foam of 4 inches diameter. However, a curing time of from about 0.6 to 10 minutes is generally suitable. When the cellular material has cooled and cured to a state of dimensional stability, it is passed from the chamber and through one or more sets of crushing rollers. These rollers may be located internally or externally to the chamber. It is essential to this process that the foam pass immediately from the extruder orifice into the curing chamber. Once foamed, a time lapse of as little as a few seconds before passing into the curing chamber will cause the foam to shrink. It is for this reason that the curing chamber should be adjacent to the extruder orifice. It is likewise essential that the cured polymer foam pass quickly to the crushing step after it has reached a state of dimensional stability in the curing chamber, since a delay of as little as 30 seconds before crushing will result in a shrunken or collapsed foam. Longer delays only make the effect more pronounced. Cellular material prepared as taught, employing the treating chamber and crushing rolls, does not shrink, collapse or form surface indentations.

It is important that the volatile organic fluid blowing agent, e.g. a normally gaseous agent, and the thermoplastic polymer form a gel and that the gel be blended to homogeneous composition and a substantially uniform temperature throughout its mass, under pressure, prior to its extrusion into a zone of lower pressure, in order to obtain a cellular product composed of individual cells of substantially the same size. The size of the cells formed in the cellular product and also the bulk density of the latter may be varied at will by varying the temperature of the gel and its content of the dissolved volatile organic fluid throughout its mass at the point of extrusion. In general, an increase in such temperature causes a decrease in the bulk density of the product formed upon release of the pressure for a given proportion of the dissolved volatile agent.

The pressure maintained on the mixture may be varied at will by varying the size of the extrusion die, or the length of the orifice, through which the mobile gel is discharged into the chamber, or by changing the rates of feed of the normally gaseous agent and the polymer to the vessel. The mobile gel discharged from the extruder is a more readily flowable composition than is the heat-plastified or molten polymer prior to contact with the normally gaseous agent. Also, for an extrusion die having a passageway of a given cross-sectional area there is a minimum rate of feed of the polymer and the normally gaseous agent to the extruder which is required in order to obtain a desired pressure on the mixture.

The following examples illustrate ways in which the principle of the invention has been applied, but are not to be construed as limiting.

EXAMPLE 1

A 1¼ inch extruder was modified so that blowing agents could be added through the barrel, and a double acting air-driven pump was used as the prime mover for the agents. The foaming die was a 3/16 inch diameter orifice located at the end of the extruder. A homogeneous gel of polyethylene containing 2 weight percent of Celite and 0.5 weight percent of zinc stearate as nucleating agents and n-butane as the blowing agent was extruded at 104 degrees C. and 585 p.s.i.g. at the rate of 20.5 pounds per hour into a curing chamber containing vapors of ethyl chloride. Residence time in the chamber was about 40 seconds. The foam was then passed through two sets of crushing rolls set at right angles to each other to rupture walls of the cells of the foam. The resulting foam product had a density of 2.6 pounds per cubic foot and a diameter of 29/32 inch. When a curing time of 2 minutes was used, a foam diameter of one inch was obtained.

The experiment was repeated but without using the crushing rolls. The surface of the foam product was rough and indented. The diameter of the foam varied between 5/8 and 3/4 inch. The foam surface was rough. Similar poor results were obtained when both the curing step and the crushing step were omitted.

The following Table I summarizes the results of a series of runs with different blowing and curing agents using polyethylene containing nucleating agents as in Example I. Extrusion was at 102 degrees C., 400 p.s.i.g., and 24 pounds per hour.

*Table I*

| Run No. | Blowing Gas | Curing Gas | Curing Time, Min. | Crushing | Foam Density | Foam Diameter, Inches | Foam Surface |
|---|---|---|---|---|---|---|---|
| 1 | A | None | | No | (¹) | ½ to ¾ | Rough. |
| 2 | A | Ethyl Chloride | 5 | Yes | 3.0 | 15/16 | Smooth. |
| 3 | A | A | 5 | Yes | 2.6 | 1 1/16 | Do. |
| 4 | B | None | | No | (¹) | 3/8 to 3/4 | Rough. |
| 5 | B | Ethyl Chloride | 5 | Yes | 2.2 | 1 1/16 | Smooth. |

¹ Could not determine due to shrinkage and roughened surface.
A: A mixture of 21.5 weight percent of fluorotrichloromethane and 78.5 weight percent of dichlorodifluoromethane.
B: A mixture of 13 weight percent methyl chloride and 87 weight percent ethyl chloride.

EXAMPLE 2

A copolymer of 80 weight percent ethylene and 20 weight percent ethyl acrylate and containing dichlorotetrafluoroethane as a blowing gas was extruded as in Example 1 with and without the curing and crushing steps. The following Table II summarizes the results obtained.

It will be noted that when both curing in contact with vapors of a volatile organic fluid and crushing of the cured foam are carried out, a product of substantially greater diameter and smooth surface are obtained.

Similar results were obtained when ethyl chloride, butane, propylene, butylene, trichlorofluoromethane, dichlorodifluoromethane, or methyl chloride were the normally gaseous agents used in the curing chamber.

*Table II*

| Run | Curing Gas | Curing Time, Min. | Crushing | Foam Diameter, Inches | Foam Surface |
|---|---|---|---|---|---|
| 1 | Dichlorotetrafluoroethane. | 5 | No | 7/8 | Rough. |
| 2 | ----do---- | 5 | Yes | 1 3/8 | Smooth. |
| 3 | ----do---- | None | Yes | 1 3/16 | Rough. |
| 4 | ----do---- | None | No | 7/8 | Do. |

EXAMPLE 3

Employing similar equipment and procedures of Example 2 (except that a slightly smaller orifice was used), the ethylene copolymer was extruded into an atmosphere of dichlorotetrafluoroethane and was immediately cured for 5 minutes, then was crushed according to the invention. The product had a diameter of 1 1/16 inch and a density of 2.2.

When a foam was prepared by passing it immediately through the foaming and curing chamber in an atmosphere of dichlorotetrafluoroethane for 5 minutes, but was then allowed to stand in the air at room temperature for a period of 1 hour, prior to the crushing step, the foam after crushing had a diameter of only 13/16 inch, a density of about 4.2 pounds per cubic foot, and a rough irregular surface.

I claim:

1. An improved process for the production of substantially uniform non-shrinking flexible plastic foams comprising (1) extruding a thermoplastic polymer selected from the group consisting of polyethylene and copolymers of ethylene containing a volatile organic fluid as blowing agent, into a foaming and curing chamber wherein the atmosphere consists predominantly of vapors of a normally gaseous agent which diffuses into the foam at about the same rate as the blowing agent diffuses out of the foam; and (2) almost immediately thereafter crushing the foamed product to rupture at least a portion of the cells therein.

2. The method of claim 1, wherein the thermoplastic organic polymer is polyethylene.

3. The method of claim 1, wherein the thermoplastic organic polymer is a copolymer of ethylene with ethyl acrylate.

4. The method of claim 1, wherein the blowing agent is dichlorotetrafluoroethane and the normally gaseous agent in the curing chamber is ethyl chloride.

5. An improved process for the continuous production of substantially uniform non-shrinking flexible plastic foams comprising (1) extruding a thermoplastic polymer selected from the group consisting of homopolymers and copolymers of ethylene containing a volatile organic fluid as blowing agent into a foaming and curing chamber wherein the atmosphere consists predominantly of vapors of a normally gaseous agent which has an appreciable solubility in the polymer and which diffuses into the foam at about the same rate the blowing agent diffuses out of the foam; and (2) immediately thereafter crushing the foamed product to rupture at least a portion of the cells therein.

6. An improved process for the continuous production of substantially uniform non-shrinking flexible plastic foams comprising (1) extruding a thermoplastic polymer selected from the group consisting of homopolymers and copolymers of ethylene containing a volatile organic fluid as blowing agent, into a foaming and curing chamber wherein the atmosphere consists predominantly of vapors of a normally gaseous agent selected from the group consisting of aliphatic halocarbons and hydrocarbons and (2) immediately thereafter crushing the foamed product to rupture at least a portion of the cells therein.

7. An improved process for the continuous production of substantially uniform non-shrinking flexible plastic foams comprising (1) extruding a thermoplastic polymer selected from the group consisting of homopolymers and copolymers of ethylene containing a volatile organic fluid as blowing agent into a foaming and curing chamber wherein the atmosphere consists predominantly of vapors of a normally gaseous agent selected from the group consisting of aliphatic halocarbons and hydrocarbons, (2) maintaining said polymer foam in contact with vapors of said normally gaseous agent for a time sufficient to cool and cure the polymer to a dimensionally hard and stable form; then (3) immediately thereafter crushing the foamed product to rupture at least a portion of the cells therein.

8. An improved process for the continuous production of substantially uniform non-shrinking flexible plastic foams comprising (1) extruding a thermoplastic polymer selected from the group consisting of homopolymers and copolymers of ethylene containing a volatile organic fluid blowing agent into a foaming and curing chamber wherein the atmosphere consists predominantly of vapors of a normally gaseous agent selected from the group consisting of aliphatic halocarbons and hydrocarbons, (2) maintaining said polymer foam in contact with vapors of said normally gaseous agent for a time of from about 1 to 10 minutes and (3) immediately thereafter crushing the foamed product to rupture at least a portion of the cells therein.

References Cited by the Examiner
UNITED STATES PATENTS

| | | | |
|---|---|---|---|
| 1,045,234 | 11/12 | Willis et al. | 264—54 |
| 2,537,977 | 1/51 | Dulmage | 264—53 |
| 2,774,991 | 12/56 | McCurdy et al. | 264—53 |
| 2,795,008 | 6/57 | Lindermann et al. | 264—54 |
| 2,857,625 | 10/58 | Carlson | 264—53 |
| 2,933,767 | 4/60 | Vieli et al. | 264—321 XR |

OTHER REFERENCES

German application B 22,954, Sept. 6, 1956.

ALEXANDER H. BRODMERKEL, *Primary Examiner.*